(12) United States Patent
Hegnauer

(10) Patent No.: US 6,380,882 B1
(45) Date of Patent: Apr. 30, 2002

(54) MOTION DETECTOR BASED ON THE DOPPLER PRINCIPLE

(75) Inventor: Stefan Hegnauer, Dübendorf (CH)

(73) Assignee: Siemens Building Technologies AG, Mannedorf (CH)

( * ) Notice: Subject to any disclaimer, the term of this patent is extended or adjusted under 35 U.S.C. 154(b) by 0 days.

(21) Appl. No.: 09/608,903

(22) Filed: Jun. 30, 2000

(30) Foreign Application Priority Data

Jul. 3, 1999 (EP) .......................................... 99 112 885

(51) Int. Cl.$^7$ .............................. G01S 7/40; G01S 13/56
(52) U.S. Cl. ...................... 342/28; 342/106; 342/107; 342/109; 342/113; 342/114; 342/115; 342/192; 342/196; 340/554
(58) Field of Search .............................. 340/541, 545.3, 340/552, 554, 565, 567, 573.1; 342/27, 28, 104, 106, 107, 109, 112, 113, 114, 115, 192, 193, 196

(56) References Cited

U.S. PATENT DOCUMENTS

| | | | | |
|---|---|---|---|---|
| 3,677,647 A | * | 7/1972 | Misek .......................... 356/28 |
| 3,796,989 A | * | 3/1974 | Ravas et al. ................... 367/41 |
| 3,832,709 A | * | 8/1974 | Klein et al. ................... 342/127 |
| 4,203,113 A | | 5/1980 | Baghdady ...................... 343/14 |
| 4,225,858 A | * | 9/1980 | Cole et al. .................... 340/554 |
| 4,565,996 A | * | 1/1986 | Close ........................ 340/572.1 |
| 4,595,924 A | * | 6/1986 | Gehman ........................ 342/28 |
| 4,697,184 A | | 9/1987 | Cheal et al. ................... 342/28 |
| 5,087,918 A | * | 2/1992 | May et al. ..................... 342/85 |
| 5,521,600 A | * | 5/1996 | McEwan ....................... 342/27 |
| 5,596,325 A | * | 1/1997 | Maas .......................... 342/28 |
| 5,682,164 A | * | 10/1997 | McEwan ....................... 342/27 |
| 5,715,044 A | * | 2/1998 | Hayes ........................ 356/50.9 |
| 5,936,524 A | * | 8/1999 | Zhevelev et al. ........... 340/552 |

* cited by examiner

Primary Examiner—John B. Sotomayor
(74) Attorney, Agent, or Firm—BakerBotts LLP

(57) ABSTRACT

A motion detector based on the Doppler principle contains a microwave module for emitting a microwave signal containing at least two frequencies into a room under surveillance and for receiving the radiation reflected from the latter. An evaluation stage is connected to the microwave module and generates first and second Doppler signals from the received radiation. The first and second Doppler signals have a phase difference which is proportional to the distance of an object reflecting the microwave signal. The phase difference is determined by an integral transformation. In addition, the relative size of an object and the direction of travel of an object reflecting the microwave signal can be determined by the evaluation stage.

19 Claims, 3 Drawing Sheets

MOTION DETECTOR BASED ON THE DOPPLER PRINCIPLE

FIELD OF INVENTION

The invention relates generally to motion detectors and more particularly relates to a motion detector based on the Doppler principle which employs a microwave module for emitting a microwave signal into a room under surveillance containing at least two frequencies and detecting a phase difference in the signals which is proportional to, inter alia, the distance of an object moving in the room under surveillance.

BACKGROUND OF THE INVENTION

Motion detectors that employ the Doppler principle have a weakness in that small objects, such as, for example, insects or raindrops, situated near the detector can be distinguished only with very great difficulty from further removed, larger objects. As a result, distinguishing distant humans from small domestic animals at a lesser distance and from insects positioned near the detector is made considerably more difficult or even made impossible. In addition, there is the problem that oscillating fixed objects, such as, for example, curtains or leaves moved by the wind or even oscillating fans cannot be distinguished from actual motion occurrences. Because of these disadvantages, such motion detectors have a relatively high false alarm rate and are therefore used virtually exclusively as dual detectors.

To avoid the disadvantages mentioned, U.S. Pat. No. 4,697,184 proposes emitting a microwave signal containing alternating frequencies and deriving from the signal reflected by an object in the room under surveillance first and second Doppler signals that have a phase difference proportional to the distance of the object. The phase difference is measured and an alarm signal is triggered if the phase difference exceeds a specified limit value for a certain duration. In this system, which uses a hardware differential amplifier to determine the phase difference, interferences resulting from multiple-path propagation, such as, for example, reflections from walls, the floor and the ceiling and noise are not significantly suppressed.

The present invention is therefore intended to provide a microwave motion detector in which the interferences mentioned, such as multi-path interference, are reliably suppressed. The present invention is also intended to provide enhanced detection parameters, such as target velocity, expected position and the like.

OBJECTS AND SUMMARY OF INVENTION

The above objects are achieved, according to the invention, in that the phase difference is determined by an integral transformation. Compared with other methods for measuring phase, the integral transformation has the advantage of superior noise and other interference suppression.

In accordance with the invention, a motion detector based on the Doppler principle includes a microwave module for emitting a microwave signal containing at least two frequencies into a room under surveillance and for receiving reflections of said microwave signal. An evaluation stage is operatively coupled to the microwave module. The evaluation stage receives that reflected signals and generates first and second Doppler signals that have a phase difference proportional to the distance of an object reflecting the microwave signal. The evaluation stage applies an integral transformation to the received reflected signal to determine the phase difference.

In one embodiment of the motion detector, the integral transformation is additionally used to determine the sign of the phase difference and/or the radial velocity of the object concerned relative to the detector.

In another embodiment of the motion detector, the integral transformation is additionally used to determine the signal strength of the received signal.

Yet another embodiment of the motion detector includes two channels that are disposed downstream of the output of the microwave module in which the signals are amplified, filtered and fed to a corresponding analog/digital converter. In this case, the integral transformation for two signals can be performed by integrating the absolute values of the signals in the two channels, multiplying the signals, integrating the result of this multiplication and also dividing the resultant signal.

In a further embodiment of the motion detector the microwave module emits a microwave signal containing more than two frequencies. This embodiment has the advantage that emitting more than two frequencies resolves ambiguities, such as may occur in two-frequency operation. Such ambiguities may be due, for example, to very distant reflections that are suppressed in the motion detector described in U.S. Pat. No. 4,697,184 by relatively complex and expensive hardware.

Yet a further embodiment of the motion detector includes a number of channels that correspond to the number of frequencies that are disposed downstream of the output of the microwave module and in which the signals are amplified, filtered and each fed to an analog/digital converter. In this case, the integral transformation is carried out by a Fourier transformation, a fast Fourier transformation or a wavelet transformation.

In another embodiment of the motion detector the microwave module and the evaluation stage form part of a first detector of a dual detector that contains, in addition, a second detector, such as a passive infrared detector, and the signals of the first detector and those of the second detector are fed to a common processing stage in which the signals are combined. In a further embodiment of the motion detector, the result of the combination contains information about the quality of the object moving in the room under surveillance.

BRIEF DESCRIPTION OF THE DRAWING

The invention is explained in greater detail below by reference to an exemplary embodiment shown in the drawings, wherein.

DETAILED DESCRIPTION OF PREFERRED EMBODIMENT

Figure 1:
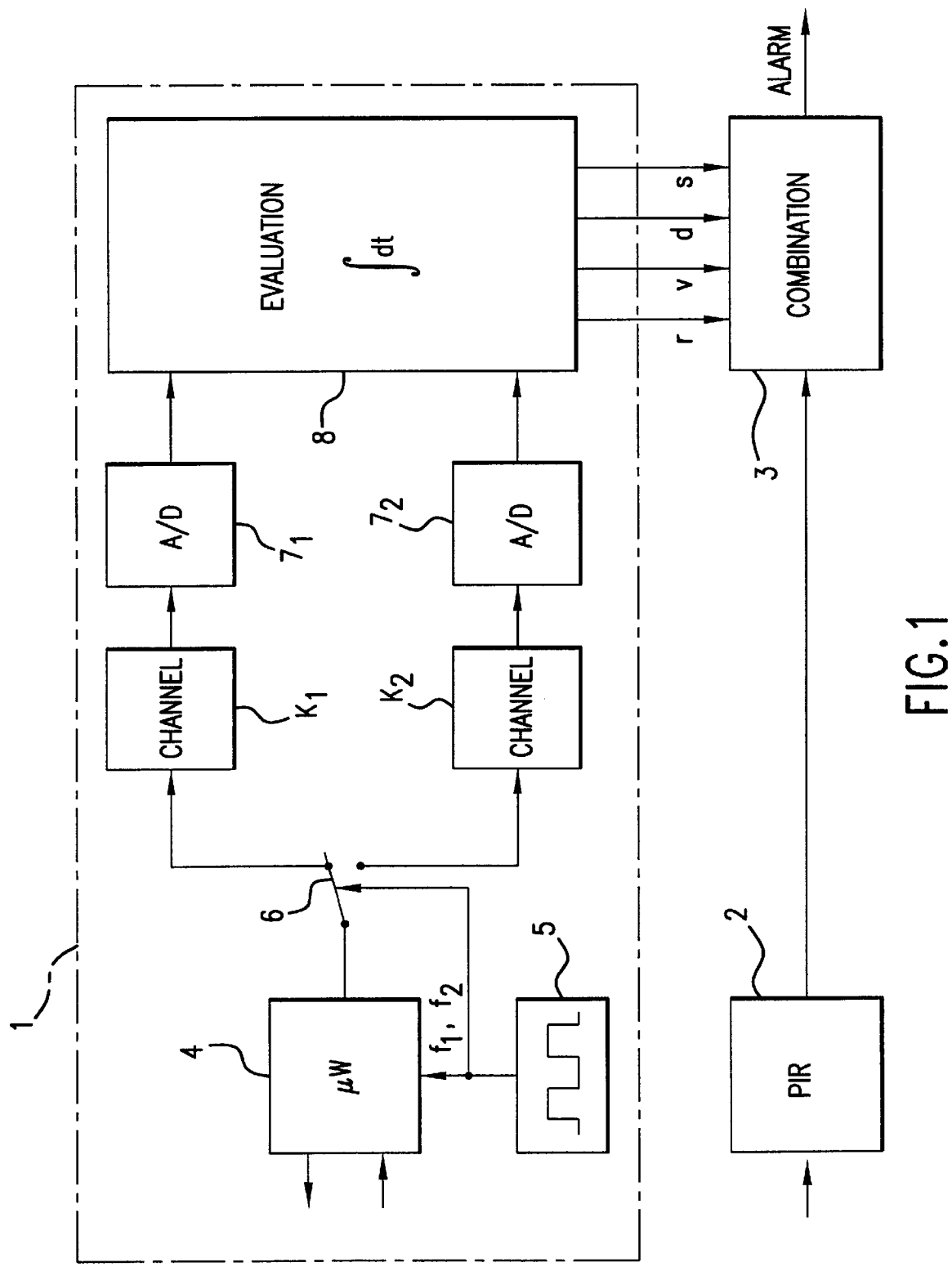
FIG. 1 is a block diagram of a dual detector comprising a microwave detector according to the invention and a passive infrared detector.

The dual detector shown in FIG. 1 includes a microwave detector 1, a passive infrared detector 2 and a common processing stage 3. At the output of the evaluation stage an alarm signal is obtainable if an unauthorized intruder is present in the room under surveillance monitored by the detector shown. The microwave detector 1 contains a microwave module 4 for emitting and for receiving microwave radiation. Associated with the microwave module 4 is a microwave generator 5 that generates a microwave signal containing at least two frequencies $f_1$ and $f_2$ that are fed periodically to the microwave module 4 and to a switch 6 disposed downstream of the latter. The microwave module 4 is periodically switched between the two frequencies $f_1$ and $f_2$ and the switch 6 is actuated accordingly. While not shown, the microwave module can preferably emit a number of different frequencies, n. In this case, the switch 6 and generator 5 are adapted to selectively generate these n frequencies and direct the reflected signals to n corresponding processing channels (K1 . . . Kn).

In radar technology, various methods of distance measurement are known. The two most common techniques measure either the time required for a short transmitted pulse to propagate from the transmitting aerial to the object and back to the receiving aerial (pulse radar with echo time measurement) or the difference in frequency between the emitted signal having the frequency f at the time t and the received signal that was sent at time t-$\Delta$t having another frequency f-$\Delta$f (FM radar).

If two or more fixed frequencies are used in a Doppler radar, the corresponding Doppler signals at the output of the receiving mixer have a defined phase relationship between one another. In the case of two fixed frequencies (diplex), $f_1$ and $f_2$ having a frequency difference $\Delta\omega$, the resultant phase difference $\Delta_{100}$, at the output of the receiving mixer is $\Delta_{100} \equiv (2\Delta\omega/c)r$ where c is the velocity of light and r is the required distance from the detector to the object reflecting the microwave radiation. This equation applies without alteration even for the case of several fixed frequencies (multiplex). Because the phase measurement is cyclical, a measurement ambiguity can result. In prior art devices the resultant ambiguity is resolved by limiting the range of the mricrowave module (i.e., range gate) or by using a suitable frequency multiplex.

Returning to FIG. 1, in the case of a two frequency detector, the switch 6 distributes the output signal of received reflected radiation detected by the microwave module 4 over two identical signal channels $K_1$ and $K_2$ in which the signals are amplified and filtered and are each fed to an analog/digital converter $7_1$ and $7_2$, respectively. Preferably, further digital filtering can then be used to remove interferences (not shown). The digital signals can then be fed to an evaluation stage 8 in which an integral transformation of the signals of the two signal channels $K_1$ and $K_2$ is carried out. Generally, integral transformation is the transformation of a function, the so-called object function, into another function, the so-called result function, brought about by an integral operator. The result function is also described as the image of the integral transformation. This process is used to obtain result functions that are simpler to handle and to obtain results relating to the object function more easily as compared to the object function.

Examples of an integral transformation are Fourier transformation, fast Fourier transformation, Laplace transformation and wavelet transformation. These methods can be used in the present motion detector, especially if the microwave signal contains more than two frequencies. In this case a corresponding number of channels $K_1$ . . . $K_n$ are also provided.

Figure 2:
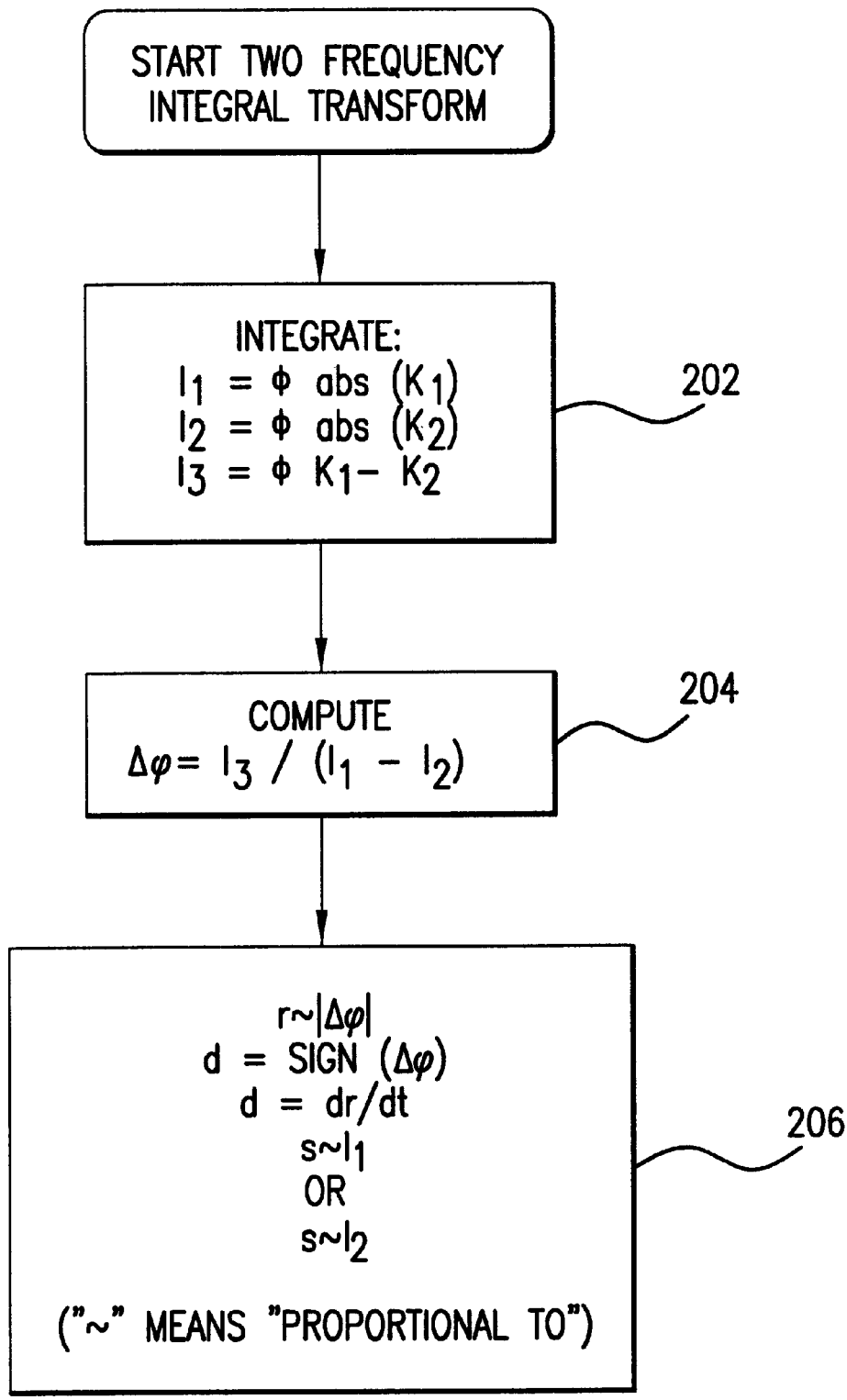
FIG. 2 is a flow chart illustrating an integral transformation suitable for use in the present invention.

FIG. 2 illustrates a method of integral transformation which can be used in the case of only two frequencies $f_1$ and $f_2$ being generated by the microwave module. In this case, the reflected signals are processed in two channels $K_1$ and $K_2$, respectively. The integral transformation of the present method consists in integrating the absolute values of the signals in the two channels $K_1$ and $K_2$ ($I_1$ and $I_2$, respectively). The signals are also multiplied ($K_1 * K_2$) and the integral of the product ($I_3$) is calculated as well (step 202). The resultant three integrals can then be used to yield the desired target properties. For example, the cosine of the phase difference in the signals, $\Delta\phi$, can be determined directly by dividing $I_3$, the integral of the product of the signals, by the product of $I_1$ and $I_2$ (step 204). The target distance (r) is approximately equal to the absolute value of $\Delta\phi$ (step 206). In addition to the distance (r), the motion direction (d) can be determined by the sign of $\Delta\phi$. (step 206). By sampling the signals over time, the radial velocity (v) of the object relative to the detector (dr/dt) can be determined (step 206). The relative signal strength (s) of the received signal can also be derived directly from the integral transformation ($I_1$ or $I_2$).

In the case where a Fourier transformation is used, the parameters frequency (proportional to the radial velocity), phase and amplitude are obtained directly for each channel. 15 The signals of a moving object yield approximately the same frequency and amplitude in all channels, but exhibit different phases. In this regard, the absolute value of the phase difference of two channels is proportional to the distance (r) and the polarity of the phase difference of two channels (sign of $\Delta\phi$) yields the motion direction (d). If the phase difference of two channels is formed in such a way that the phase resulting from the channel having the higher transmitter frequency is subtracted from the phase resulting from the channel having a lower transmitter frequency, the resultant sign of a motion away from the microwave module 4 is positive. Conversely, the sign of the phase difference is negative for a motion towards the detector.

Alternatively, in the simple case involving only two frequencies and when a Fourier transformation is not used, the sign of the phase can be obtained, for example, by differentiating the phase differences of consecutive measurements, that is to say differentiating the phase with respect to time (d$\phi$/dt). In this regard, a negative d(p/dt denotes motion towards the microwave module 4 and a positive d$\phi$/dt a motion away from it. The amplitude of the signals, which is approximately equal in the two channels, can be obtained directly by integrating the absolute values of the signals. On the other hand, the frequency of the signals, if desired, is obtained not from the integral but, for example, by counting the passages through zero in a particular time interval.

The parameters mentioned (r, v, d, s) are fed from the evaluation stage 8 to the processing stage 3, which is also connected to the passive infrared detector 2. The evaluation stage can be implemented using a microprocessor, application specific integrated circuit, digital signal processing chip, and the like which are programed to perform the integral transform operations discussed above. The processing stage 3 can be a separate programmable logic device, discrete logic circuit, or microprocessor or can be integrated into the processor used for the evaluation stage.

The passive infrared detector 2 is assumed to be known and is therefore not described in greater detail here. In this regard, reference is made for example, to EP-A-0 646 901, EP-A-0 303 913 and EP-A-0 707 294. The passive infrared detector 2 responds to the body radiation of a human being in the infrared spectral range and the microwave detector 1 to the frequency shift due to the Doppler effect in the radiation reflected by a moving intruder. By combining the two detection principles, the undesirable intrusion of an individual into the protected room can be detected with greater reliability and selectivity than if only one of the two detection methods is used. In this way, a false alarm emission can be avoided with greater reliability.

In the processing stage 3, the four parameters (r, v, d and s) of the microwave detector 1 and the signals of the passive infrared detector 2 are combined with one another in such a way that a conclusion can be drawn about the quality of the moving object. Based on various combinations of these inputs, the processing stage 3 can determine whether the detected target is a "human being" or some other form of target. For the conclusion "human being", an alarm signal is provided on an output of the processing stage 3. For the other target distinctions, such as "ventilator", "small animal" or "insect," a non-alarm condition is detected and no further actions are necessary. However, should these conditions persist, a detector trouble signal can be generated.

The conclusion "human being" is drawn if both the PIR detector 2 and Doppler detector 1 respond and if, in addition, the signal strength (s) for the relevant distance (r) exceeds a threshold value, which can be predetermined. A "small animal" or "insect" conclusion is detected from the fact that the signal strength for the relevant distance is less than the value associated with a human being. A ventilator or fan can be detected from the fact that the passive infrared detector 2 has not responded.

With the radial velocity (v) and the sign (d) of the phase difference, the following evaluations, in particular, are also possible:

Integration of the velocity (v) with the correct sign yields, for example, the distance traversed, which makes interferences, such as swinging curtains (distance very small, curtain is remaining in position) or ventilators (distance is large, but the distance is constant) and the like detectable and distinguishable.

From the velocity (v), it is possible to predict where the object should be located at the instant of the next measurement.

Figure 3:
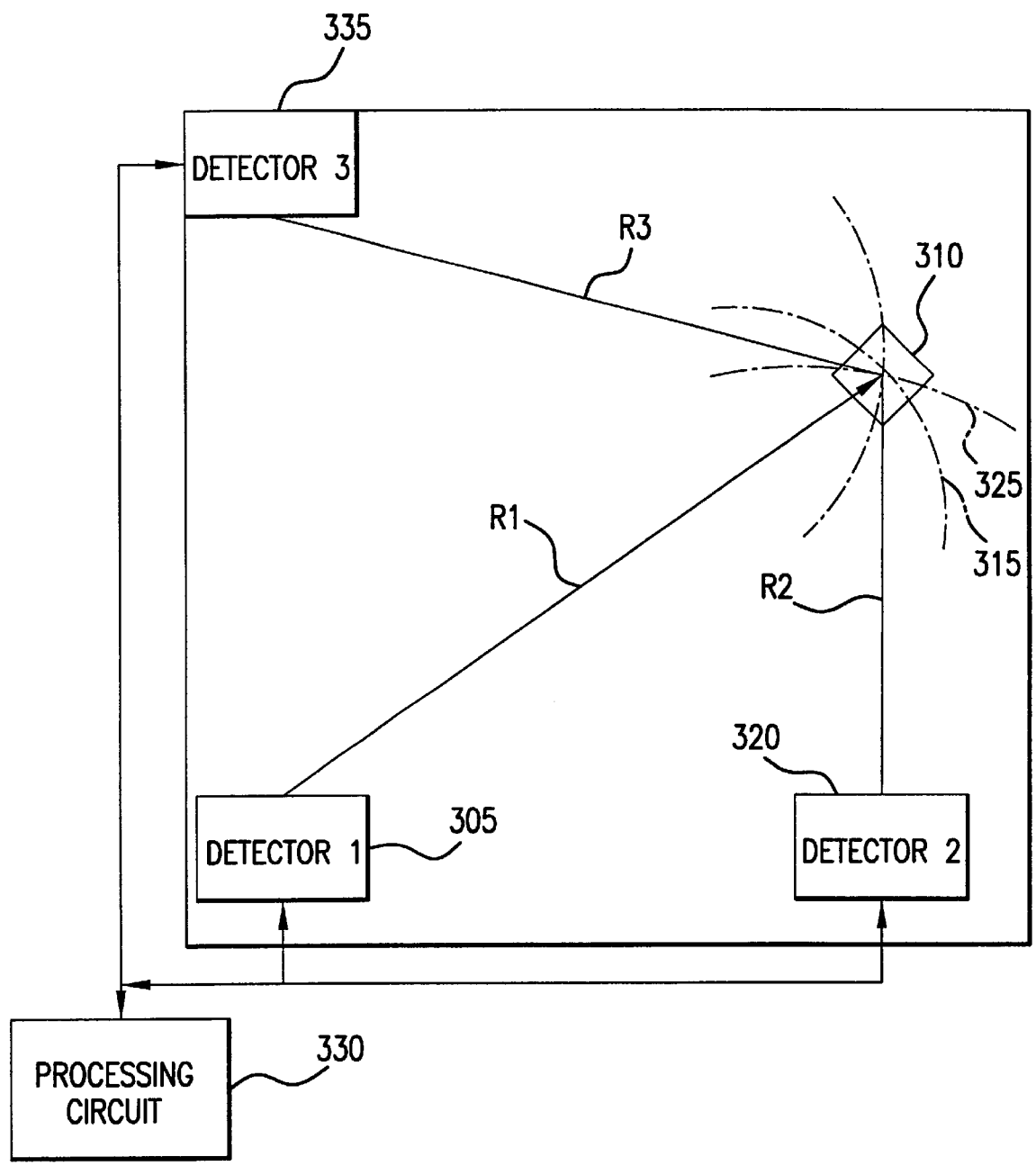
FIG. 3 is a pictorial diagram illustrating an application of a plurality of Doppler detectors in accordance with the invention in cooperative use to determine a position of a target in an area under surveillance.

Suitable combination of the signals of a plurality of Dopler detectors in accordance with the present invention makes possible a two-dimensional position determination of a moving object in the measurement space. Referring to FIG. 3, a first Doppler detector 305 is provided in a measurement space and can resolve the location of a target 310 along an arc 315 at a distance along a radius, $R_1$. A second Doppler detector 320 is also provided in a measurement space spaced apart from the first Doppler detector, such as in an opposite corner from the first Doppler detector 305, and can resolve the location of the target along a second arc 325 at a second distance along a radius, $R_2$. Given that the locations of the first and second Doppler detectors are known, by receiving the distance indication from each detector, a common position processing circuit 330 can calculate the point or points of intersection of the two arcs in the two dimensional plane of the measurement space. The position processing circuit can be located in one of the Doppler detectors can be removably located therefrom. With two detectors, an ambiguity can arise in that radii $R_1$ and $R_2$ can intersect in two places. For a moving object, the ambiguity arising from two detectors can be resolved over several measurements to determine which point of intersection represents the actual target. For a fixed target, or to remove all ambiguity regarding target position in a single measurement interval, a third detector 335 can be added in the measurement space and coupled to processing circuit 330.

With three detectors, the radii from the detectors to the target uniquely intersect at only a single point in the measurement space.

Although not shown in the drawings, the motion detector generally includes a sabotage monitoring device, sometimes referred to as an anti-mask device. Various forms of anti-mask devices are known, therefore this feature is not described in greater detail. In this regard, reference is made to European Patent Application No. 99 110 848.1 of the Applicant of the present patent application and also to EP-A-0 476 397.

The description of the microwave detector 1 as a component of a dual detector is not to be understood as restrictive and is not intended to mean, in particular, that the microwave detector 1 could not also be used alone as an autonomous microwave detector. In addition, it will be appreciated that it is expected that ultrasound devices operating with the Doppler principle can also be used in the present invention in place of, or in combination with, the microwave module 4.

The motion detector according to the invention has the main advantages that the false alarm rate is considerably improved by distance-independent suppression of signals triggered by small animals and insects and that noise and other interferences can be suppressed better by the integral transformation. In addition, several moving objects can also be resolved, which imposes, however, substantially higher demands on the signal processing, in particular in relation to memory storage space and computing power. These advantages are achieved with a modest additional expenditure compared with conventional passive infrared/microwave dual detectors.

What is claimed is:

1. A motion detector based on the Doppler principle, comprising:

a microwave module for emitting a microwave signal containing at least two frequencies into a room under surveillance and for receiving reflections of said microwave signal; and an evaluation stage which is operatively coupled to the microwave module and in which the received reflected microwave signal generates first and second Doppler signals that have a phase difference proportional to the distance of an object reflecting the microwave signal, said evaluation stage applying said received reflected signal to an integral transformation to determine said phase difference.

2. The motion detector according to claim 1, wherein the integral transformation is additionally used to determine at least one of the direction (d) and the radial velocity (v) of the object concerned relative to the detector.

3. The motion detector according to claim 2, wherein the integral transformation determines the signal strength of the signal received.

4. A motion detector based on the Doppler principle, comprising:

a microwave module for emitting a microwave signal containing at least two frequencies into a room under surveillance and for receiving reflections of said microwave signal;

an evaluation stage which is operatively coupled to the microwave module and in which the received reflected microwave signal generates first and second Doppler signals that have a phase difference proportional to the distance of an object reflecting the microwave signal, said evaluation stage applying said received reflected signal to an integral transformation to determine said phase difference, and further comprising first and second signal channels, said channels being coupled downstream of the microwave module, said chanels amplifying and filtering the received reflected signals which are each fed to an analog/digital converter to provide digitized reflected signals and wherein the integral transformation further comprises integrating the absolute values of the digitized reflected signals in the two channels resulting in values I1 and I2, integrating a multiplication product of the digitized signals resulting in a value I3 and applying the resultant integrals to determine at least one of distance, target type, direction, and velocity.

5. The motion detector according to claim 4, wherein the distance of an object to the detector is determined by the absolute value of I3/(I1*I2).

6. The motion detector according to claim 4, wherein the relative direction of an object with respect to the detector is determined by the sign of I3/I1*I2.

7. The motion detector according to claim 4 wherein the signal strength of the reflected signal is determined by one of I1 or I2.

8. The motion detector according to claim 2, wherein the microwave module emits a microwave signal containing more than two frequencies.

9. The motion detector according to claim 3, wherein the microwave module emits a microwave signal containing more than two frequencies.

10. The motion detector according to claim 8, further comprising a plurality of signal channels corresponding to the number of frequencies emitted by the microwave module, said channels being coupled downstream of the of the microwave module, said channels amplifying and filtering the received reflected signals which are each fed to an analog/digital converter and wherein the integral transformation is a transform selected from the group including a Fourier transformation, a fast Fourier transformation and a wavelet transformation.

11. A motion detector according to claim 1, wherein the microwave module and the evaluation stage form part of a first detector of a dual detector that further comprises a second detector, the signals of the first detector and those of the second detector being fed to a common processing stage in which said signals are combined.

12. A motion detector according to claim 11, wherein the result of the combination contains information about the quality of the object moving in the room under surveillance.

13. A motion detector according to claim 12, wherein the quality of the object includes a relative target size which is determined by the received signal strength and calculated distance.

14. A motion detector according to claim 4, wherein the evaluation stage analyzes the sign of the phase difference of two channels and yields the direction of motion of the object reflecting the signals.

15. A method for detecting a target within a measurement space using a Doppler motion detector which generates at least first and second signals which provide at least first and second reflected signals, the method comprising:

receiving the first and second reflected signals;

integrating the absolute values of the first reflected signal (I1) and second reflected signal (I2);

integrating the product of the first and second reflected signals (I3);

determining the phase difference between the first and second reflected signals as I3/(I1*I2); and estimating the distance of a target as the absolute value of the phase difference.

16. The method for detecting a target of claim 15, wherein the relative signal strength of at least one of the first and second reflected signals is determined and the distance and relative signal strength are used to determine a characteristic of the target.

17. The method for detecting a target of claim 16, wherein the characteristic of the target is selected from the group including human, small animal and insect.

18. The method for detecting a target of claim 16, wherein the characteristic of the target is one of alarm condition or non-alarm condition.

19. The method for detecting a target of claim 18, wherein the alarm characteristic is determined when the relative signal strength for a given distance exceeds a threshold value.

* * * * *